(12) United States Patent
Nikovski et al.

(10) Patent No.: US 8,938,348 B2
(45) Date of Patent: Jan. 20, 2015

(54) METHOD FOR OPTIMIZING RUN CURVE OF VEHICLES

(75) Inventors: Daniel Nikovski, Brookline, MA (US); Bernard Lidicky, Prague (CZ)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 281 days.

(21) Appl. No.: 13/324,075

(22) Filed: Dec. 13, 2011

(65) Prior Publication Data

US 2013/0151107 A1  Jun. 13, 2013

(51) Int. Cl.
*G01C 21/26* (2006.01)
*G01C 21/34* (2006.01)

(52) U.S. Cl.
CPC ................................ *G01C 21/3446* (2013.01)
USPC ............. 701/99; 701/400; 701/411; 701/423; 701/426; 701/467

(58) Field of Classification Search
None
See application file for complete search history.

(56) References Cited

U.S. PATENT DOCUMENTS

| | | | |
|---|---|---|---|
| 8,396,624 B2 * | 3/2013 | Hyde et al. | 701/34.2 |
| 8,473,197 B2 * | 6/2013 | Horvitz | 701/423 |
| 8,571,791 B2 * | 10/2013 | Hyde et al. | 701/425 |
| 8,612,140 B2 * | 12/2013 | Gutman | 701/410 |
| 8,626,436 B2 * | 1/2014 | Gutman | 701/408 |
| 8,634,975 B2 * | 1/2014 | Chen et al. | 701/21 |
| 8,694,026 B2 * | 4/2014 | Forstall et al. | 455/456.3 |
| 8,706,409 B2 * | 4/2014 | Mason et al. | 701/424 |
| 2008/0249667 A1 * | 10/2008 | Horvitz et al. | 701/1 |
| 2009/0299496 A1 * | 12/2009 | Cade | 700/29 |
| 2010/0106603 A1 * | 4/2010 | Dey et al. | 705/14.63 |
| 2010/0138096 A1 * | 6/2010 | Hung et al. | 701/25 |
| 2010/0174440 A1 * | 7/2010 | Franchineau et al. | 701/29 |
| 2011/0161258 A1 * | 6/2011 | Nikovski | 706/12 |
| 2012/0161986 A1 * | 6/2012 | Amir | 340/932.2 |
| 2012/0202538 A1 * | 8/2012 | Uusitalo et al. | 455/500 |
| 2012/0277940 A1 * | 11/2012 | Kumar et al. | 701/20 |
| 2012/0290159 A1 * | 11/2012 | McGee et al. | 701/22 |
| 2014/0005876 A1 * | 1/2014 | Xu et al. | 701/29.1 |
| 2014/0005877 A1 * | 1/2014 | Xu et al. | 701/29.1 |

FOREIGN PATENT DOCUMENTS

EP          2341447 A2    7/2011

* cited by examiner

*Primary Examiner* — Jonathan M Dager
(74) *Attorney, Agent, or Firm* — Dirk Brinkman; Gene Vinokur

(57) ABSTRACT

A method determines a run-curve of a motion of a vehicle as a function of at least a speed of the vehicle and a position of the vehicle in a continuous space. First, the method determines Markov decision process (MDP) with respect to a set of anchor states selected from the continuous space, such that a control moving the vehicle to a state transitions the MDP to an anchor state with a probability determined as a function of a distance between the anchor state and the state in the continuous space, and solves the MDP subject to constraints to determine an MDP policy optimizing a cost function representing a cost of the motion of the vehicle. Next, the method determines the run-curve based on the MDP policy.

17 Claims, 12 Drawing Sheets

100

200

500

600

700

800

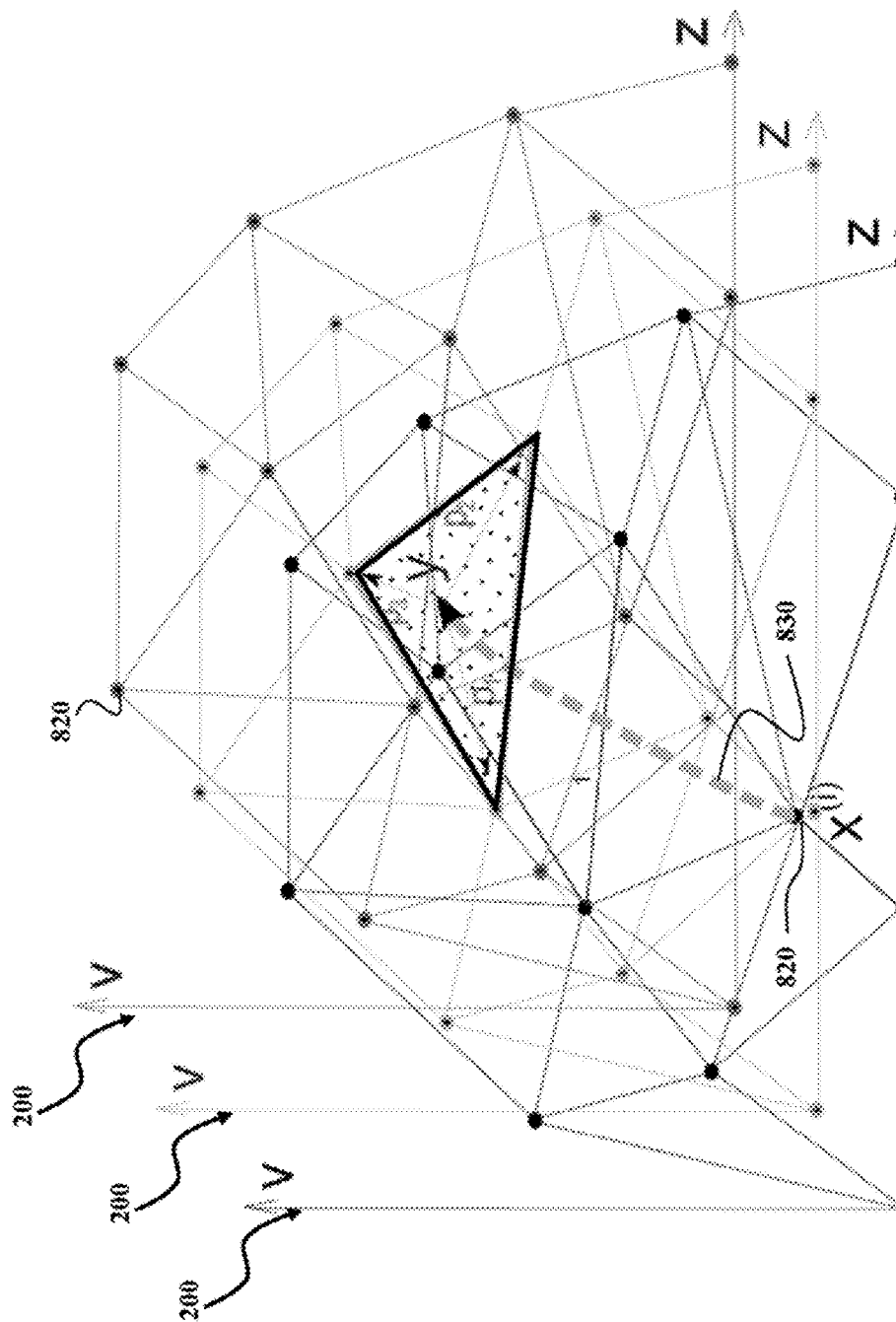

METHOD FOR OPTIMIZING RUN CURVE OF VEHICLES

FIELD OF THE INVENTION

This invention relates to optimizing motions of vehicles, and more particularly to determining an optimal run curve of a vehicle.

BACKGROUND OF THE INVENTION

Many transportation problems, such as the energy-efficient operation of electrical trains, guided transport systems at airports, or hybrid cars can be reduced to optimizing a velocity profile of a moving vehicle along a route. The velocity profile is called a run curve. If a distance along the route is denoted by z, then a desired velocity v(z) at position z describes the run curve. The run curve has to obey legal and mechanical constraints of the route, e.g. speed limits, safety margins, and must be physically realizable by mechanisms of the vehicle.

For example, an automatic train control (ATC) is a known method to control vehicles, such as trains. With ATC, when the velocity of the train exceeds a specified permitted maximum velocity over a particular section of the route, a brake system is activated and the train is decelerated. It is advantageous for the run curve determination to be adaptive to various constraints, such as constraints on the speed limit. For example, the velocity of the high speed train can be regulated according to a stepwise reduction of predetermined maximum velocities, i.e. 80 km/h, 65 km/h, 45 km/h, and 25 km/h. If the train is required to run at a given limited velocity over a certain section, then the permitted maximum velocity is gradually reduced in steps approaching a target limited velocity of the section.

However, the optimal run curve should provide more benefits that just obeying the legal constraints of the route. For example, in some situations, the optimal run curve should minimize running times between an origin and a destination, e.g., located at z=0 and z=Z, respectively. Additionally, the optimal run curve should minimize the required minimal energy consumed by the vehicle along the route.

Usually, these two requirements are contradictory to each other, i.e., the shorter the running time, the more energy is needed, and vice versa. Thus, there is a need to provide a method and a system for determining an optimal run curve for the vehicle.

SUMMARY OF THE INVENTION

It is an object of various embodiments of an invention to provide a system and a method for determining a run curve of a vehicle during a trip from an origin to a destination. It is further object of some embodiments of the invention to determine the run curve that optimizes energy consumption of the vehicle during the trip. It is further object of some embodiments of the invention to determine the run curve that optimizes both the energy consumption of the vehicle and the time of the trip. It is further object of some embodiments of the invention to determine the run curve that optimizes the energy consumption of the vehicle for a predetermined time of the trip.

It is further object of some embodiments of the invention to reduce the computational complexity of the calculation of the run curve. It is further object of some embodiment of the invention to determine the optimal run curve in real time. It is further object of some embodiments of the invention to determine a sequence of controls representing the run curve for controlling a motion of the vehicle during the trip.

Some embodiments of the invention are based on a realization that a continuous space of the trip of the vehicle can be converted in a discrete space in a form of a Markov decision process (MDP), such that solution to the MDP in the discrete space can be used to determine the run curve in the continuous space. Specifically, in some embodiments, the MDP is constructed based on another realization that mathematical properties of probability functions used by the MDP and convex combinations of vectors are similar. Such realization is used by the embodiments to determine the MDP. Specifically, embodiments use a principle that a control action, which moves the vehicle to a state in a continuous space, transitions the MDP to a discrete state of the MDP with a probability determined as a function of a distance between the discrete state of the MDP and the state in the continuous space.

A solution of the MDP determines an MDP policy that optimizes a cost function. In various embodiments, the solution to the cost function is subject to constraints, including one or combination of a legal constraint, a constraint of a route, and a constraint of the vehicle. Also, the cost function represents a cost of the motion of the vehicle during the trip. The run-curve determined based on the MDP policy optimizes that cost.

Accordingly, various embodiments vary the cost function to achieve specific objectives of the embodiments. For example, in one embodiment, the cost function represents the energy consumption of the vehicle during the trip, and the run curve optimizes the energy consumption. Additionally or alternatively, in various embodiments, the cost function represents both the energy consumption and the time of the trip, or the energy consumption for a predetermined time of the trip.

Moreover, Applicants herein are generally realized that usage of the MDP reduces the complexity of the run curve calculation, but not always fast enough to be used in real time during the trip of the vehicle. This is because some MDPs have self-transitions for the states of the MDP resulting in a need for an iterative approach to solve the MDP. However, Applicants further realized that specific sampling of the continuous space to embed the MDP can eliminate the self-transition problem and reduce the complexity of the computation.

For example, one embodiment uses equal-distance MDP states sampling, wherein the states of the MDP are located on a number of vertical lines in a continuous space, such that multiple states have the same distance coordinate. Such states form a stage, and state transitions occur only between consecutive stages, enabling real time solutions, e.g., by means of backward dynamic programming.

Another embodiment uses three-dimensional sampling, wherein the MDP for the predetermined time of the trip includes a replica of a triangulation for multiple time steps, organized into time slices. Each transition is from one time slice to the next, which eliminates the self-transition problem.

Accordingly, one embodiment of the invention discloses a method for determining a run-curve of a motion of a vehicle as a function of a velocity of the vehicle and a position of the vehicle in a continuous space, including determining the MDP with respect to a set of anchor states selected from the continuous space, such that a control moving the vehicle to a state transitions the MDP to an anchor state with a probability determined as a function of a distance between the anchor state and the state in the continuous space; solving the MDP subject to constraints to determine an MDP policy optimizing a cost function representing a cost of the motion of the vehicle; and determining a run-curve based on the MDP policy.

Another embodiment discloses a method for determining an optimal sequence of controls transitioning a system from an initial state to a final state in a continuous space defined by state variables of the system, wherein the optimal sequence is monotonically increasing over at least one state variable, wherein the system is a dynamic system having states defined by a dynamic function of previous states and a discrete set of controls, wherein, for each transition, a control is selected from the discrete set of controls, such that, for each control, the dynamic function transitions the system from a previous state to a next state over a step of transition, including: determining Markov decision process (MDP) with respect to a set of anchor states selected from the continuous space, such that each control from the discrete set of controls transitions the MDP from an anchor state to a next anchor state with a probability determined based on a location of the next anchor state in the continuous space with respect to a location of a state in the continuous space, in which the dynamic function of the anchor state and a corresponding control transitions the system; solving the MDP to determine an optimal policy for the MDP defining an optimal control for each anchor state; and determining the optimal sequence of controls in the continuous space based on the optimal policy.

Yet another embodiment discloses a system for controlling a motion of a vehicle comprising: a Markov decision process (MDP) curve generating apparatus for determining an MDP with respect to a set of anchor states selected from the continuous space of the motion of the vehicle and for solving the MDP to determine an MDP policy optimizing a cost function representing a cost of the motion of the vehicle; a run curve generating apparatus for generating a run curve based on the MDP policy; a control computer for generating a control signal according to the run curve; and a power supply device for supplying a power to the vehicle based on the control signal. The system can be configured to determine the run-curve of the motion of the vehicle in real time.

BRIEF DESCRIPTION OF THE DRAWINGS

FIGS. 8A-C are schematics of a method for determining the run-curve for a trip of the vehicle having the end time fixed.

DETAILED DESCRIPTION OF THE PREFERRED EMBODIMENTS

System Overview

Figure 1A:
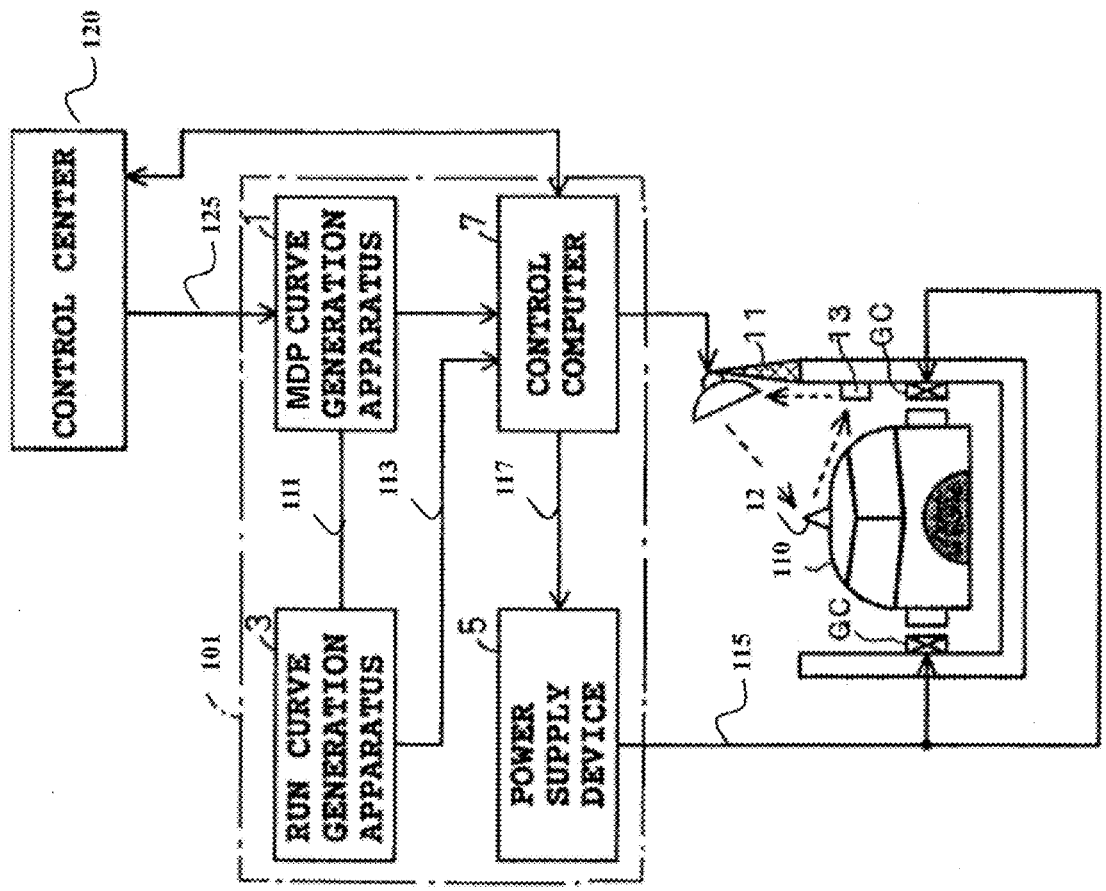
FIG. 1A is a block diagram of a system for determining a run curve of a vehicle according to some embodiments of the invention.

FIG. 1A show a system for determining a run curve of a vehicle 110 according to some embodiments of the invention. In this disclosure, the term "vehicle" is used generally and includes any means of transportation, such as, but not limited to, electrical trains, guided transport systems at airports, or hybrid cars. In this non-limiting example, the vehicle 110 is an electrical train, wherein the electric power is converted and supplied to feeders or ground coils (GC) via breakers.

A control system 101 of the vehicle 110 can include one or combination of a Markov decision process (MDP) curve generating apparatus 1, a run curve generating apparatus 3, a power supply device 5, and a control computer 7. The control system determines the run-curve of the motion of the vehicle as a function of a velocity of the vehicle and a position of the vehicle in a continuous space of a trip of the vehicle along a route.

In various embodiments, the run curve is represented by a sequence of controls applied to the vehicle during the trip. The implementation of the control system can be performed within the circuits of the vehicle, in a remote control center 120, and/or can be distributed between the vehicle and the control center. The communications between the vehicle and the control center can be achieved using wireless transceivers 11-13. Various components and modules of the control system can be implemented using a processor.

The MDP curve generating apparatus determines the MDP with respect to a set of anchor states selected from the continuous space and solves the MDP to determine an MDP policy 111 optimizing a cost function representing a cost of the motion of the vehicle. For example, in various embodiments, the cost function represents one or combination of the energy consumption of the vehicle during the trip, a time of the trip, both the energy consumption and the time of the trip, or the energy consumption for a predetermined time of the trip.

Figure 1B:
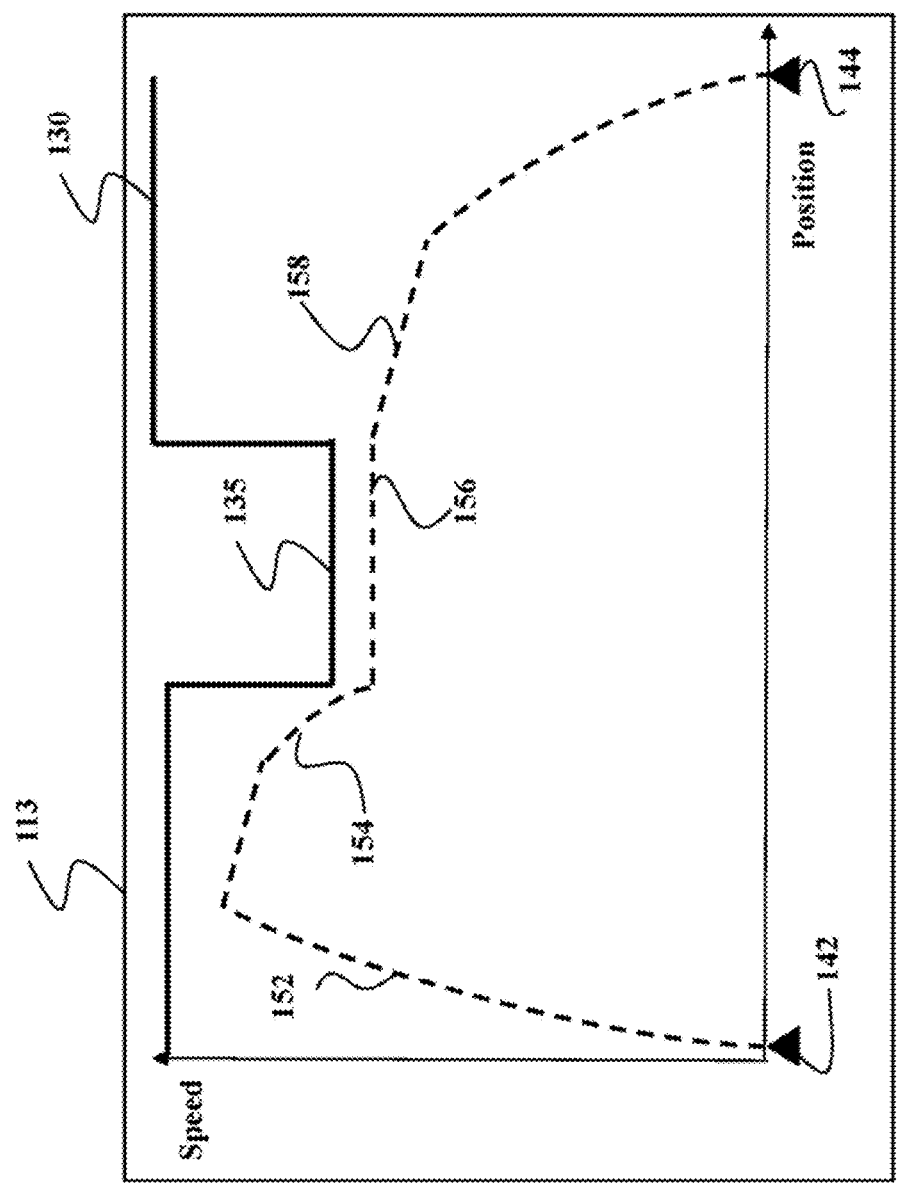
FIG. 1B is an example of the run curve determined by a system of FIG. 1A.

As shown in FIG. 1B, the run curve generating apparatus 3 generates a run curve 113 based on the MDP policy from an origin 142 to a destination 144. In some embodiments, the run curve is represented by a sequence of controls defining the motion of the vehicle.

In one embodiment, each control in the sequence is selected from a set of discrete controls including an accelerating control 152, a decelerating control 154, a running at a constant speed control 156, and a coasting control 158. Also, in various embodiments, the solution to the MDP and/or the run curve 113 is subject to constraints including one or combination of a legal constraint, a constraint of the route and a constraint of the vehicle. The constraints and the cost function can be provided 125 by the control center. Examples of constraints include a speed limit constraint 130 and speed restriction constraint 135

The power supply device 5 supplies power 115 to the ground coils GC which drive the train. The control computer 7 generates a control signal 117 to control the power supply device 5 according to the run curve 113.

Problem Formulation

Some embodiments of the invention are based on a realization that the run-curve optimization can be defined as an optimal control problem, such that a problem of determining optimal run curves is reduced to optimizing, e.g., simultaneously, time and energy criteria of the trip.

The dynamics of the vehicle can typically be represented by a set of differential equations specifying the relative position $z(t)$ of the vehicle along the route at time t, and the velocity $v(t)$ of the vehicle according to $$\dot{v} = a(z, v, u)$$

$$\dot{z} = v$$

where the function $a(z,v,u)$ describes acceleration of the vehicle when action u is applied to the vehicle at position z while moving at the velocity v. The function a incorporates the inertia of the vehicle, as represented by its mass and velocity, the slope (gradient) of the route at the location z, as well as the air resistance at velocity v.

If the state of the vehicle is a vector $x=[z, v]^T$, then the dynamics of the vehicle can be represented by the vector-valued equation $\dot{x}=f(x,u)$. The dynamic function $f$ incorporates various constraints of the motion of the vehicle. For example, the velocity of the vehicle should not exceed a speed limit.

The instantaneous power consumed by the vehicle is represented by a function $p(z,v,u)$, which depends on position, velocity, and applied control, but is otherwise time independent. When regenerative brakes are used, the function $p(z,v,u)$ can also be negative, representing energy that is generated by the vehicle and returned to an energy source. For example, for the case of electrical trains, the source is a catenary power cable above the tracks. A given control trajectory $u(t)$, $0 \leq t \leq T$ results in a total energy expenditure of $$E(T) = \int_0^T p[z(t), v(t), u(t)] dt$$

where T is the terminal time of the trip, that is, the time when the vehicle reaches its intended destination.

The embodiments use various formulations of the run-curve optimization problem depending on whether the terminal time T of the trip is fixed or not.

Formulation VTT (Variable Terminal Time)

The terminal time T is not fixed, and the objective of the embodiment is to minimize a weighted sum $J=\mu E+(1-\mu)T$ of energy and time, for a weight $\mu$, $0 \leq \mu \leq 1$. The weight can be selected according to economic considerations, e.g., the relative cost of a unit of energy vs. that of a unit of time for all passengers in the vehicle.

Formulation FTT (Fixed Terminal Time)

The terminal time T is fixed and specified in advance, and the objective of the embodiment is to minimize the energy J=E. This formulation can be useful when the trip between the origin and destination can take up to T units of time.

In both cases, the embodiments determine a function $u(t)$, $0 \leq t \leq T$ which minimizes the cost J of the motion of the vehicle, subject to the dynamics of the vehicle $\dot{x}=f(x,u)$, and the constraints and conditions $z(0)=0$, $z(T)=Z$, $v(0)=v(T)=v(Z)=0$, and $0 \leq v(z) \leq v_{max}(z)$, where Z is the distance between the origin and destination, and $v_{max}(z)$ is the speed limit for the location $z(t)$.

Both formulations VTT and FTT represent optimal control problems, and the optimal function $u(t)$ can be found by solving Equation 1 below, known as the Hamilton-Jacobi-Bellman (HJB) equation. If we define the instantaneous cost incurred when control u is applied at state x as $c(x,u)$, and the optimal cumulative cost-to-go until the end destination as $V(x,t)$, then the HJB equation relates the time derivative of V to the instantaneous cost c and the gradient of V in the state space according to $$\frac{\partial V(x, t)}{\partial t} + \min_u \{c(x, u) + \nabla V(x, t) \cdot f(x, u)\} = 0 \quad (1)$$

Here the gradient $\nabla V(x,t)$ is the vector of all spatial derivatives of $V(x,t)$ with respect to the state variables, in this case z and v. For the formulation VTT, the immediate cost function $c(x,u)$ is defined as $c(x,u) \triangleq \mu p(x,u)+1-\mu$, and for formulation FTT, as $c(x,u) \triangleq =p(x,u)$.

The HJB equation is a partial differential equation (PDE) that is seldom possible to solve analytically. Specifically for run-curve optimization, analytical solutions do not appear to be available, and numerical methods must be applied instead. The conventional method of solving PDEs is to perform numerical discretization by either finite differences or finite elements, followed by solution procedures such as the Galerkin, Rayleigh-Ritz method for multidimensional problems, or collocation. In general, implementing and verifying direct solutions to the HJB equation is difficult, and results in lengthy computations.

Accordingly, the embodiments use alternative solutions based on Markov decision processes, as described below.

Markov Decision Processes for Run-Curve Computation

Figure 2:
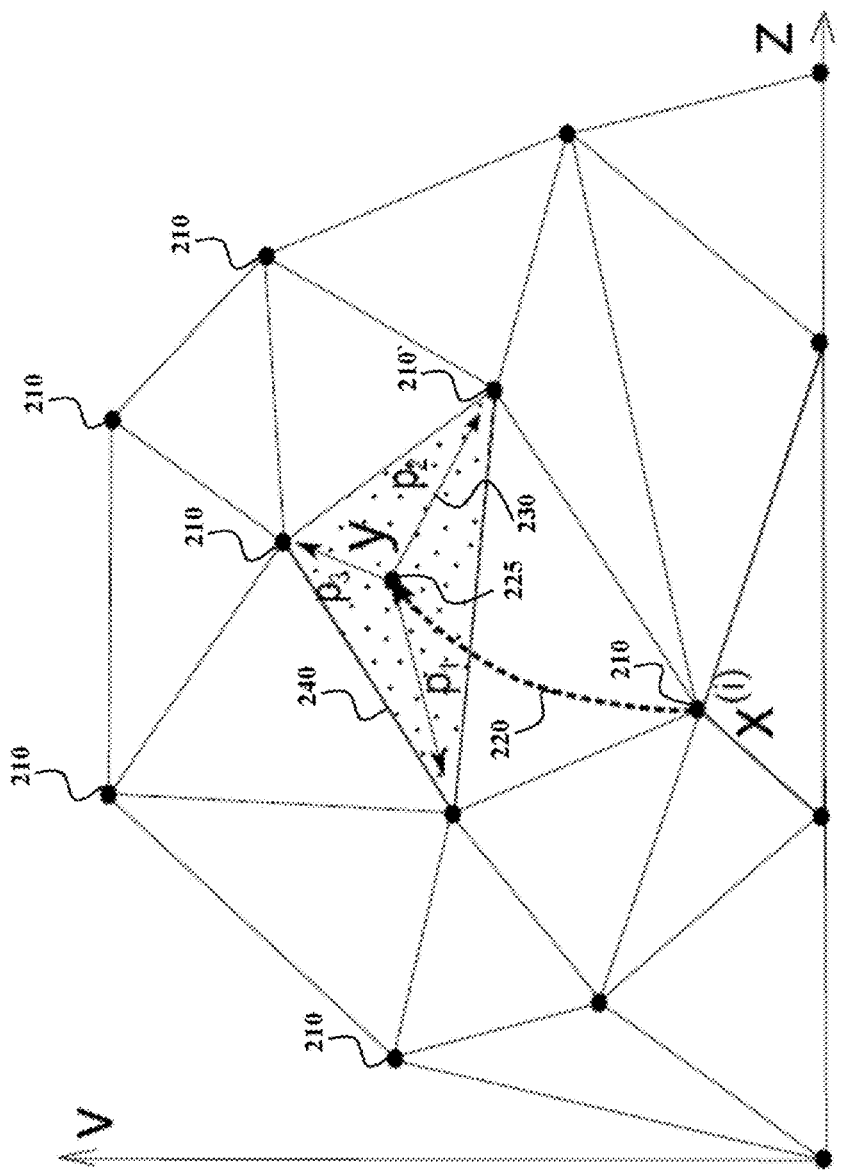
FIG. 2 is a schematic of embedding Markov decision process (MDP) in a continuous space of the motion of the vehicle according to some embodiments of the invention.

FIG. 2 show a schematic of embedding the MOP in a continuous space of the motion of the vehicle. Various embodiments determine the MDP with respect to a set of anchor states 210 selected from the continuous space 200 of the motion of the vehicle 110. Typically, the continuous space is defined as a function of the velocity V of the vehicle and a position Z of the vehicle. Other definitions of the continuous space are possible. A control 220, e.g., acceleration or deceleration, moves the vehicle to a state y 225 in the continuous space. However, the embodiments use the realization that the control 220 also transitions the MDP to an anchor state, e.g., an anchor state $p_2$ 210' with a probability determined as a function of a distance 230 between the anchor state 210' and the state 225 in the continuous space.

Accordingly, the embodiments represent the continuous-state-space problem in the form of a Markov decision process (MDP), and solve the MDP by, e.g., dynamic programming, value iteration, or policy iteration. A discrete-space of MDP is described by the tuple (S,A,P,R). The discrete-space includes a discrete set S of N states $s^{(i)} \in S$, $1 \leq i \leq N$ such that the MDP occupies one of these states $s_k \in S$ at any time $t_k$, and a set U of L actions $u^{(l)} \in U$, $1 \leq l \leq L$ that can be applied at any given time. The starting state $s_o$ is known and fixed. A transition probability function P expresses the probability $p_{ijl} \triangleq \Pr(s_{k+1}=s^{(j)}|s_k=s^{(i)}, u_k=u^{(l)})$ of being in state $S_{k+1}=S^{(j)}$ at time $t_{k+1}$ if the MDP was in state $S_k=s^{(i)}$ at time $t_k$ and control (action) $u_k=u^{(l)}$ was applied at that time. Similarly, a reward function R expresses the reward (or cost) $R_{ijl} \triangleq r(s_k=s^{(i)}, u_k=u^{(l)})$ of applying action $u_k=u^{(l)}$ to state $s_k=S^{(i)}$ at time $t_k$. The MDP evolves in discrete decision epochs that can occur at regular time intervals (e.g., $t_k=k\Delta t$), or can have no fixed time duration attached to them. The solution of the MDP optimizes a performance measure according to $J=\Sigma_{k=0}^K r(s_k, u_k)$.

Figure 3:
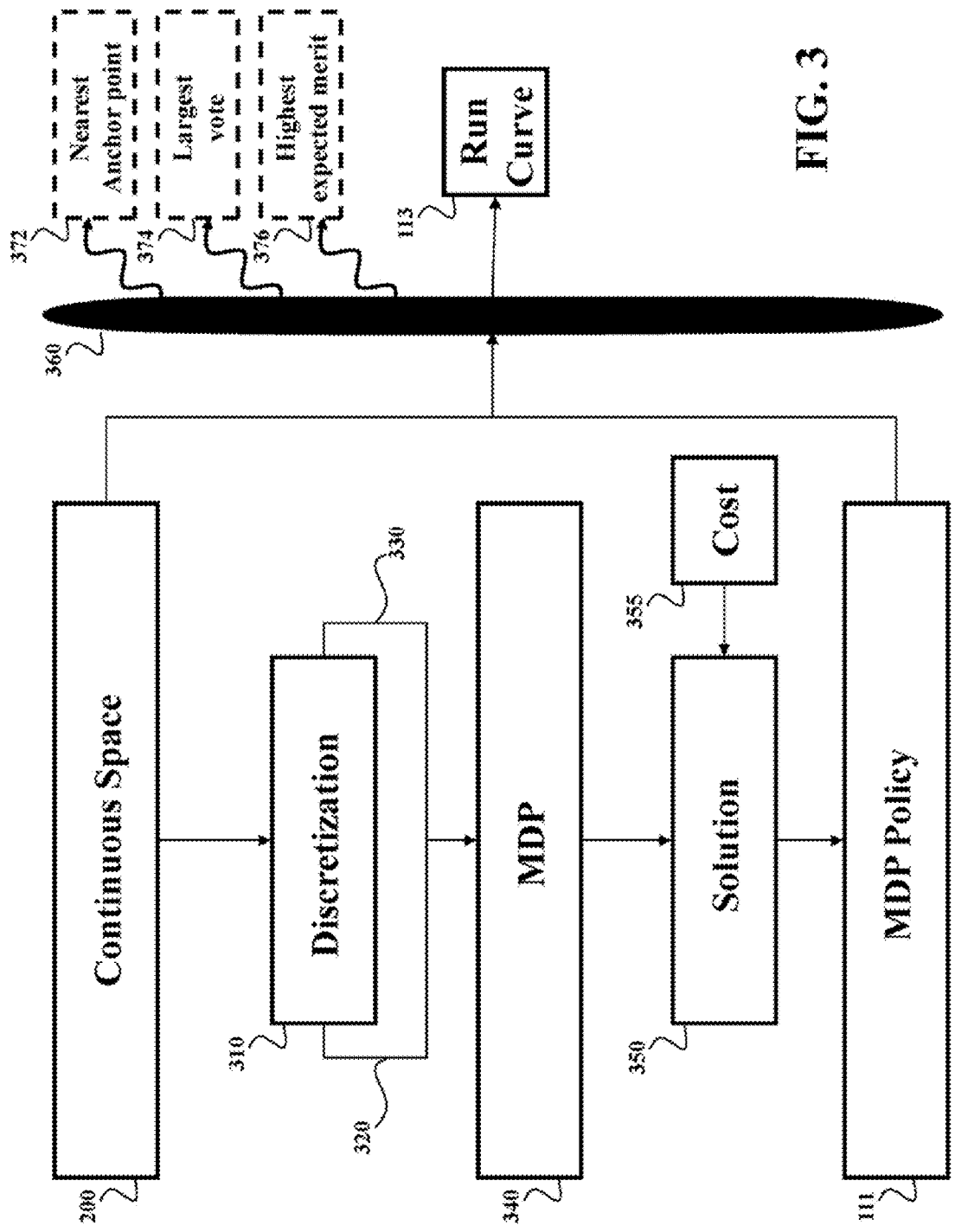
FIG. 3 is a block diagram of a method for determining the run curve using the MDP according to some embodiments of the invention.

FIG. 3 show a block diagram of a method for determining the run curve using the MDP. Because the MDP has discrete state space and evolves in discrete decision epochs, the embodiments use a series of discretizations 310 of the continuous space 200 that make the problem amenable to the MDP method. The first discretization 320 concerns the set of available controls that can be applied to the vehicle. At any given moment, some embodiments restrict the controls to one of the following four: accelerating ($u_1$), decelerating ($u_2$), running at a constant velocity ($u_3$), and coasting, ($u_4$), which is a movement due to the vehicle's own momentum. Such a restriction appears to be typical for transportation systems, and results in compact representation of the optimal sequences of controls. However, an alternative control discretization is possible, and within the scope of the invention.

The second discretization 330 discretizes the continuous-state and continuous-time dynamics of the vehicle to create discrete state space of the MDP. Various embodiments use different discretization methods 330 depending on the formulation of the problem, e.g., the VTT or the FTT, and the MDP solution method. Examples of those methods are described below.

A solution 350 of the MDP determines an MDP policy 111 that optimizes a cost function 355. In various embodiments, the solution is determined subject to constraints including one or combination of a legal constraint, a constraint of a route and a constraint of the vehicle. Also, the cost function represents a cost of the motion of the vehicle during the trip, and the run-curve determined based on the MDP policy optimizes that cost. Accordingly, various embodiments vary the cost function to achieve specific objectives of the embodiments. For example, in one embodiment, the cost function represents the energy consumption of the vehicle during the trip, and the run curve optimizes the energy consumption. Additionally or alternatively, in various embodiments, the cost function represents both the energy consumption and the time of the trip, or the energy consumption for a predetermined time of the trip.

The MDP policy represents the optimal control policy in discrete space. Accordingly, the embodiments determine 360 the run curve 113 in the continuous space based on the optimal policy, e.g., determines a control law $u=\rho(x)$ that is a mapping from the continuous state x of the moving vehicle, as opposed to the discrete state of the embedded MDP.

Several methods of the mapping are used by the embodiments. For example, a nearest anchor point 372 method determines the closest anchor state $x^{(i)}$ to x in the embedding continuous space in terms of, e.g., Euclidean distance, and use the optimal control for the corresponding MDP state $s^{(i)}$: $u=\pi^*(s^{(i)})$.

Alternatively, a largest vote method 374 determines a simplex in that includes the continuous state x, and determines the barycentric coordinates c of the state x with respect to the three vertices $v_{m,j}$, j=1,3 of that simplex.

If $u_j=\pi^*(S^{(j)})$, where $S^{(j)}$ is the state corresponding to vertex $v_{m,j}$, then the barycentric coordinates $c_j$ are used as an individual vote for the control $u_j$, and the optimal control sequence includes the action that has a highest cumulative vote over all three vertices.

Also, a highest expected merit method 376 uses the barycentric coordinates to estimate the merit $\hat{Q}(x,u)$ of the individual control u taken in state x as $\hat{Q}(x,u)=\Sigma_{j=1}^{3}c_j Q(s^{(j)},u)$, and use the control law $\rho(x)=\operatorname{argmax}_u \hat{Q}(x,u)$. Given that the barycentric coordinates c can be interpreted as individual probabilities that the MDP is in one of its discrete states, the function $\hat{Q}(x,u)$ is the expected merit of taking control action u at the continuous state x.

Other variations of determining the run curves based on the MDP policy are possible and within the scope of the invention.

Continuous State Discretization
Equal-Time MDP for VTT

In the equal-time MDP for VTT method of discretization, time is discretized at constant time intervals of length $\Delta t$, such that decisions and state transitions occur at times $t_k=k\Delta t$, where k is an integer. Accordingly, the control 220 of FIG. 2 transitions the system over a fixed period of time. The equations of motion of the vehicle can be integrated forward in time for one time interval to obtain a set of difference equations for the successor state at the end of that time interval, as $$x_{k+1}=F(x_k,u_k)=\int_{k}^{k+\Delta t}f(x,u_k)dt,$$

from initial state $x_k=x(t_k)$

The control action $u_k$ 220 remains constant throughout the entire time step, but the continuous state $x(t)$, $t_k \leq t \leq t_{k+1}$, follows a smooth trajectory from $x_k$ to $x_{k+1}$. As described above, if one or both of the state variables reach their limits during this integration, the variables should remain within the limits.

The integration method can be either exact or numerical. For example, if forward Euler integration is used, then the following set of approximate dynamical equations is used by some embodiments:

$$v_{k+1}=v_k+(\alpha_k-\beta_k-\gamma_k)\Delta t,$$

$$z_{k+1}=z_k+v_k\Delta t$$

where $\alpha_k$ is the acceleration of the vehicle, $\beta_k$ is the deceleration, both according to the selected action $u_k$, and $\gamma_k$ is the acceleration/deceleration due to the slope of the route, air resistance, and wheel friction. The time step of the integration can also be different, e.g., smaller, than the time interval $\Delta t$, in which case multiple integration steps are taken with total duration equal to $\Delta t$.

Similarly, the immediate cost. $C(x_k,u_k)$ incurred during one epoch is the integral of the instantaneous cost $c(x,u)$ over that epoch. The energy part of that cost is $$e(x_k,u_k)=\int_{k}^{k+\Delta t}p(x,u_k)dt$$

In the general case, the energy has two components: a motive component $g(x_k,u_k)$ and a regenerative component $h(x_k,u_k)$: $e(x_k,u_k)=g(x_k,u_k)-h(x_k,u_k)$. The motive component is defined as $g(x_k,u_k)=m\alpha_k v_k \Delta_t/\xi_k$, where m is the mass of the vehicle, and $\xi_k<1$ is the efficiency of conversion of electrical energy into mechanical by the motor. When dissipative brakes are used, the kinetic energy of the vehicle is converted to heat, and the regenerative component is zero: $h(x_k,a_k)$. When regenerative braking is used, the motor functions as a generator.

The generated energy is either returned to the power grid via the catenary power cable, or stored in a battery. The regenerative component is defined as $h(x_k,u_k)=m\beta_k v_k \chi_k \Delta t$, where $\chi_k<1$ is the efficiency of converting mechanical energy into electrical energy by the motor, used as a generator. In most cases, $\chi_k<\xi_k$ for the same state $x_k$.

In the formulation of the VTT, the immediate cost also has a time component, which is equal to $(1-\mu)\Delta t$, such that $$C(x_k,u_k)=\mu[g(x_k,u_k)-h(x_k,u_k)]+(1-\mu)\Delta t.$$

The similarities between vehicle dynamics and the MDPs are that both evolve in discrete time under the effect of a small number of discrete actions, and both seek to optimize a performance criterion defined over states and actions.

The two major differences are in the type of state used (continuous $x \in R^2$ vs. discrete $s \in S$) and in the way state evolution is described (function $F(x,a)$ vs. probability transition function $P_{ijl}$). The objective of the conversion method, then, is to construct a state set S embedded in $R^2$ and a transition function $P_{ijl}$ for every triple $(s^{(i)},s^{(j)},u^{(l)})$. After the MDP is constructed, an optimal policy $u=\pi(s^{(i)})$ that maps states to optimal controls can be determined for every $s^{(i)} \in S$, by using various methods, such as policy iteration and/or value iteration methods.

Some embodiments use similarities in the mathematical properties of probability functions and convex combinations. A probability function (also called sometimes a probability mass function to distinguish it from a probability density function) specifies the probability that a random variable is equal to some specified value. For the case of the MDPs, the transition function is such a (conditional) probability mass function, conditioned on the starting state $S_k = S^{(i)}$ and the applied control $u_k = u^{(l)}$. The random variable for which the probability function is specified is the successor state $S_{k+1}$. If the size of the state set S is N, let $S^{(1)}, S^{(2)}, \ldots, S^{(N)}$ be an enumeration of all states. The elements of the transition function can then be defined as $p_j \triangleq P_{ijl} = Pr(s_{k+1} = s^{(j)} \| s_k = s^{(i)}, u_k = u^{(l)})$. From the axiomatic properties of probability mass functions, it is always true that $\sum_{j=1}^{N} p_j = 1$, and $p_j \geq 0$, $j=1, N$. On the other hand, a convex combination of N vectors $y_j$, $j=1, N$ is defined as $\sum_{j=1}^{N} c_j y_j$, such that $\sum_{j=1}^{N} c_j = 1$, and $c_j \geq 0$, $j=1, N$.

By comparing the two definitions, Applicants realized that probability mass functions and the set of coefficients defining a convex combination obey exactly the same constraints, and a valid probability function can be used as coefficients of a valid convex combination, and vice versa. The embodiments use this realization to construct all transition functions of the MDP as sets of coefficients for suitably defined convex combinations.

Determining MDP

Figure 4:
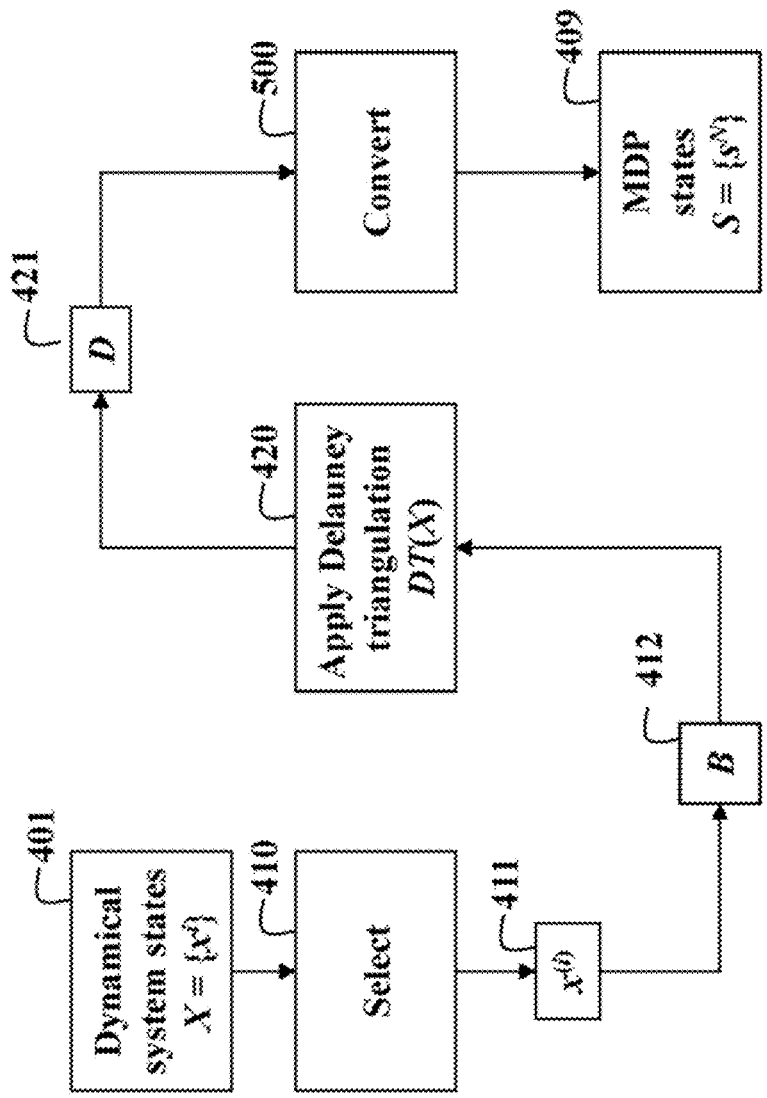
FIG. 4 is a block diagram of a process for converting a continuous state to a discrete state according to embodiments of the invention.
Figure 5:
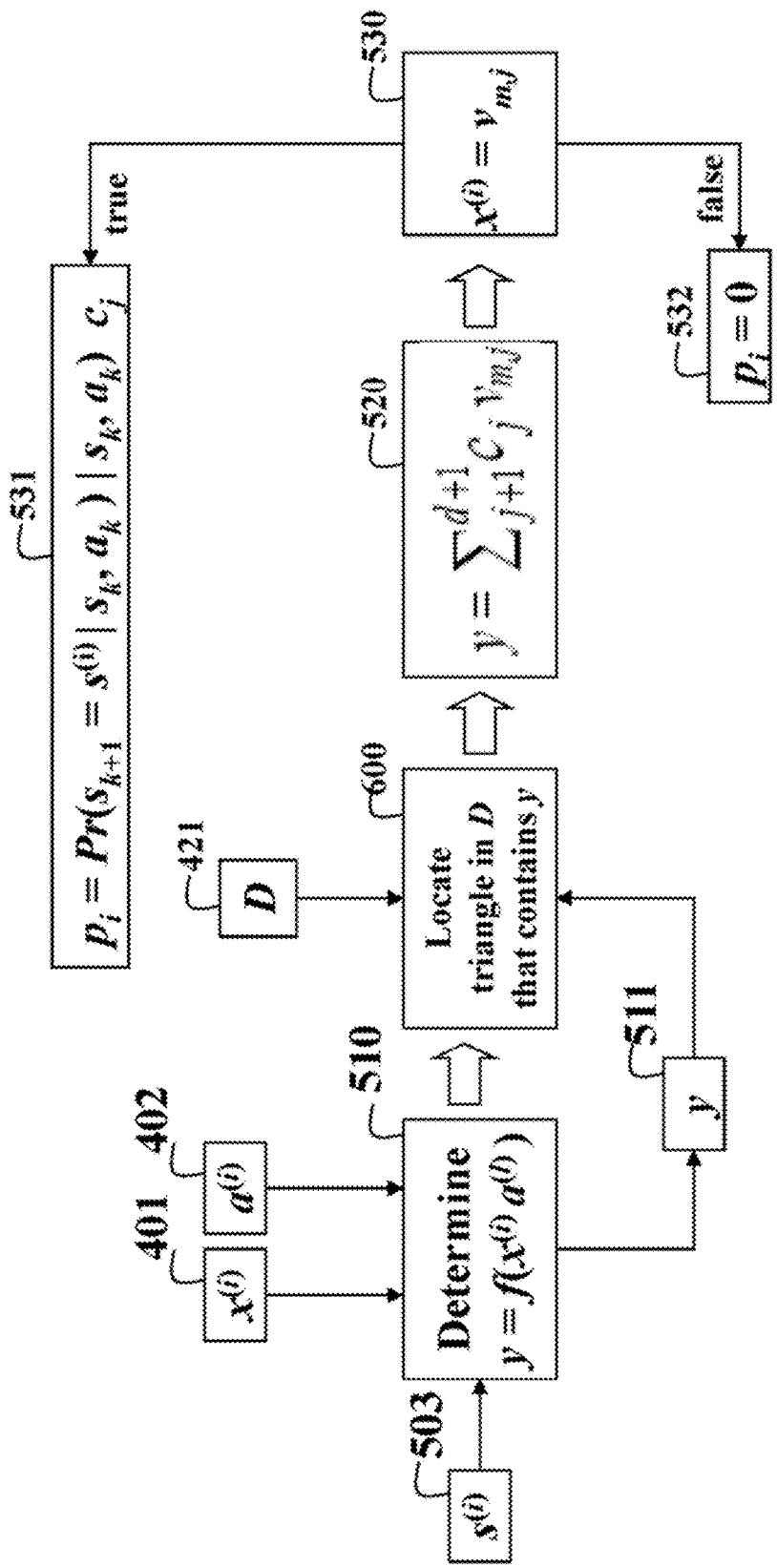
FIG. 5 is a block diagram of a process for traversing triangles representing selected continuous state according to embodiments of the invention.
Figure 6:
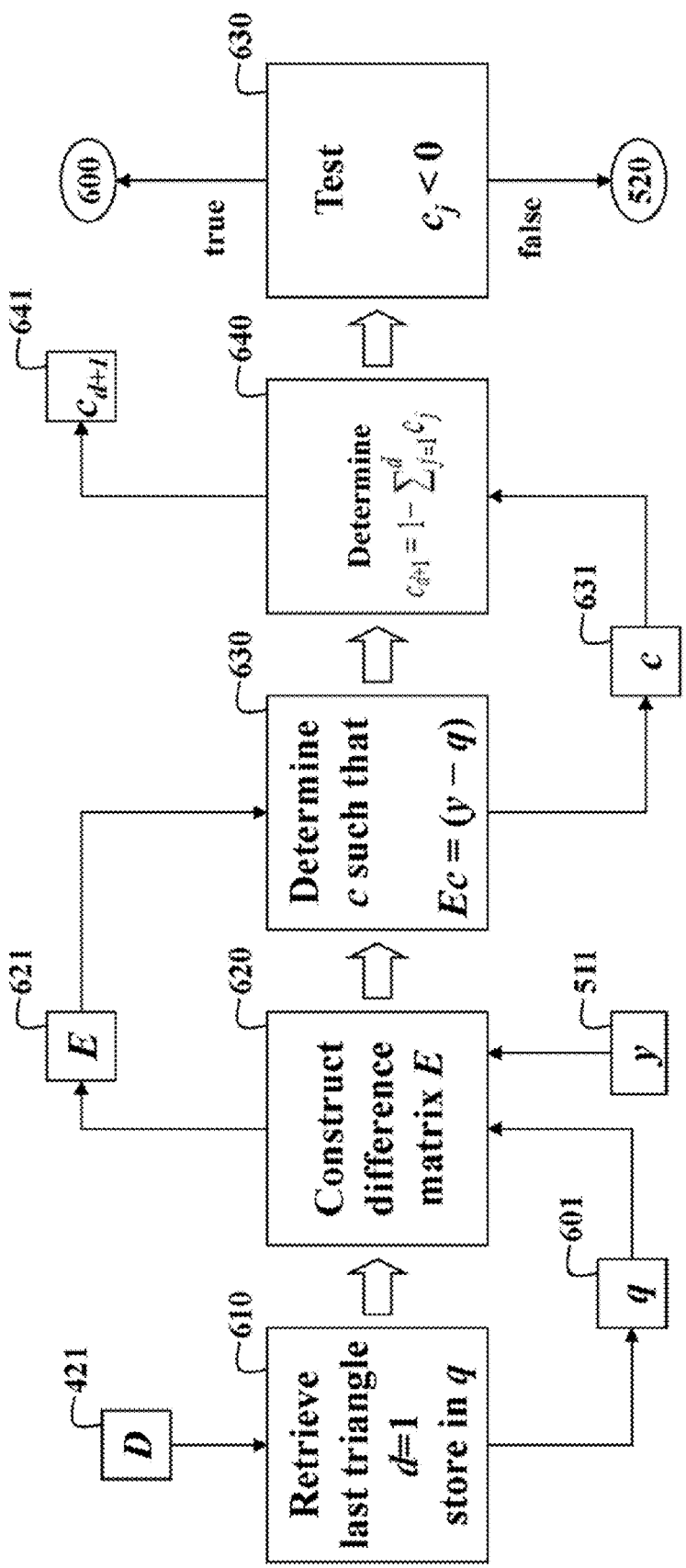
FIG. 6 is a schematic of a process for triangulating continuous states according to embodiments of the invention.

FIGS. 4-6 show an example of determining the MDP from the continuous space of dynamic system, such as the vehicle 110. In various embodiments, a sequence of controls transitioning the dynamic system from an initial state to a final state in a continuous space defined by state variables of the system. The optimal sequence is monotonically increasing over at least one state variable, e.g., the distance of the trip. The states of the dynamic system are defined by a dynamic function of previous states and a discrete set of controls. For each transition, a control is selected from the discrete set of controls, such that, for each control, the dynamic function transitions the system from a previous state to a next state over a step of transition.

The dynamical system has the set X of continuous states $x^{(i)}$ 401. Each state can be represented by a d-dimensional vector. The method selects 410 N continuous states $x^{(i)}$ 411 from the set X, such that each state $x^{(i)}$ corresponds to one of the N discrete states $S^{(i)}$ in the set S and forms the MDP states 409. The selecting can sample the continuous state space uniformly and randomly. The selected states are stored in a d×N matrix B 412, where each column is one of the selected states.

In one embodiment, Delaunay triangulation DT(X) is applied 420 to the set. The triangulation produces M triangles m. The triangles are stored in a matrix D 421, where each column corresponds to a triangle, and the three rows correspond to the vertices of the triangles.

Simplex

Generally, each triangle can be replaced by the more general term simplex, which is a generalization of a triangle in a state space X of arbitrary dimensionality d. For example if the number of dimensions d=2, then the number of vertices in the simplex (or triangle) is d+1=3, and for d=3, the simplex is a tetrahedron with d+1=4 vertices.

As shown in FIG. 5, the states s are converted 500 one state at a time. For each state $S^{(i)}$ 503, the corresponding state $x^{(i)}$ 401 and control $a^{(l)}$ 402 is retrieved 510, and used to determine 510 a next state $y = f(x^{(i)}, a^{(l)})$ 504, where $f$ is an arbitrary non-linear function that describes the evolution of the continuous-state-space system. FIG. 5 shows the case when i=0, and $y = f(x^{(0)}, a)$, for some action a.

As described for FIG. 6, the next state y 225 does not coincide with any of the selected states $x^{(i)}$. The particular triangle m 240 in DT(X) that contains the next state y 225 is located 600 by traversing all M triangles.

For the current triangle m, the last vertex $v_{m, d+1}$ of the triangle m is retrieved and stored 610 in a vector q. A d×d difference matrix E 621 is constructed 620. In the matrix E, column j contains the differences $v_{m,j} - q$, for $j=1, d$. A d-dimensional vector c is determined such that $Ec = (y-q)$ by solving a set of simultaneous linear equations.

The final element $c_{d+1}$ 641 of the vector c is determined 640 as $c_{d+1} = 1 - \sum_{j=1}^{D} c_j$. For every element $c_j$, $j=1, d+1$, test if $c_j$ is negative, i.e., $c_j < 0$. If true, then the triangle in does not contain the state y, increment m, and repeat for the next triangle.

Otherwise, if all $c_j$ are positive, then the triangle m contains the state y. The d+1-dimensional vector c contains coefficients that define a valid convex combination such that $y = \sum_{j=1}^{d+1} c_j v_{m,j}$ at step 520. Therefore, the vector c defines a valid probability transition function, because all of its entries are non-negative and sum to unity.

To construct a complete transition probability distribution for all possible N next states, the following step are performed for each discrete state $s^{(l)}, l=1, N$.

If the state $s^{(l)}$ corresponds to one of the vertices of the triangle m, that is, $x^{(l)} = v_{m,j}$ 530 for some j, then the corresponding transition probability $p_l$ 230 of the MDP is $p_l = Pr(s_{k+1} = s^{(l)} | s_k = s^{(i)} a_k) | s_k, a_k) \doteq c_j$ 531, and otherwise,
$p_l = 0$ 532.

Conceptually, the dynamical system represented by the function $f$ is equivalent to a probabilistic representation involving only a small set of discrete states $S^{(i)}$ embedded in the continuous states X of the dynamical system.

If the system starts in one of these states, then the next state y, in general, does not coincide with another one of these states. The d+1 states that define the vertices of the triangle completely enclose the next state y. That is, the system has transitioned not to the state y, but to the vertices of the corresponding triangle with various probabilities.

The probabilities are equal to a convex decomposition of the state y with respect to the vertices of the triangle that contains the state y. These probabilities can also be viewed as barycentric coordinates of the state y with respect to the vertices of the enclosing triangle. This is made possible by the similarities between convex combinations and probability mass functions for the MDP.

To decrease processing time, an inverse $E^{-1}$ of the matrix E can be stored for every triangle in the Delaunay triangulation, and then used in step 330 to determine $c = E^{-1}(y-q)$, rather than solving a set of linear equations each iteration.

In some embodiments, the traversal of the triangles of the Delaunay triangulation is improved based on a realization that the triangle that encloses the next state y is near the triangle for the current state. If the distance between the current state and the centroid of each triangle is predetermined, then the triangles of the Delaunay triangulation can be traversed in increasing order of the distances.

Solving the Equal-Time MDP

Some embodiments solve the MDP using a value iteration procedure, which includes executing the following assignment in multiple passes over the entire state space of the MDP until the value function V(s) converges:

$$V(s) := \min_u \left[ R(s, u) + \sum_{s'} Pr(s_{k+1} = s' \mid s_k = s, u_k = u) V(s') \right]. \quad (2)$$

A single such assignment is known as a Bellman back-up and is computationally simple, because there are at most three possible successor states s' for each state s. During these value iteration steps, the value of the terminal state that corresponds to the destination station is held constant and equal to some suitable value, e.g., zero. After the value function converges, the value function satisfies Equation 2 as equality. After that, the optimal policy for the MDP can be determined as $\pi^*(s) = \operatorname{argmax}_u Q(s, u)$, where we make use of the auxiliary function $Q(s,u) = R(s,u) + \Sigma_{s'} Pr(s_{k+1}=s' \mid s_k=s, u_k=u) V(s')$.

Equal-Distance MDP for VTT

The equal-time (ET) MDP method is relatively slow, due to the need to use the value iteration procedure. This need arises from the cycles in the transition graph of the MDP. For example, when a transition out of the vertex $x^{(i)}$ of one triangle ends up in that same triangle, the resulting MDP has a self-transition for the state $S^{(i)}$ corresponding to this vertex. Hence, the corresponding Bellman equation for that state includes $V(s^{(i)})$ on both sides of the equation resulting in an iteration to a fixed point.

Accordingly, there is a need to construct an MDP where the states are linearly ordered in such a way that the Bellman equation for every state s includes in its right-hand side only successor states that are lower in that order than the state Such MDPs can be solved using only a single Bellman back-up per state, starting with the lowest elements and proceeding backward to the highest. Clearly, an MDP with self-transitions does not have such an ordering. However, the MDPs constructed based on equal-distance of the control actions, rather than equal-time control action described above, have such linear ordering.

Figure 7A:
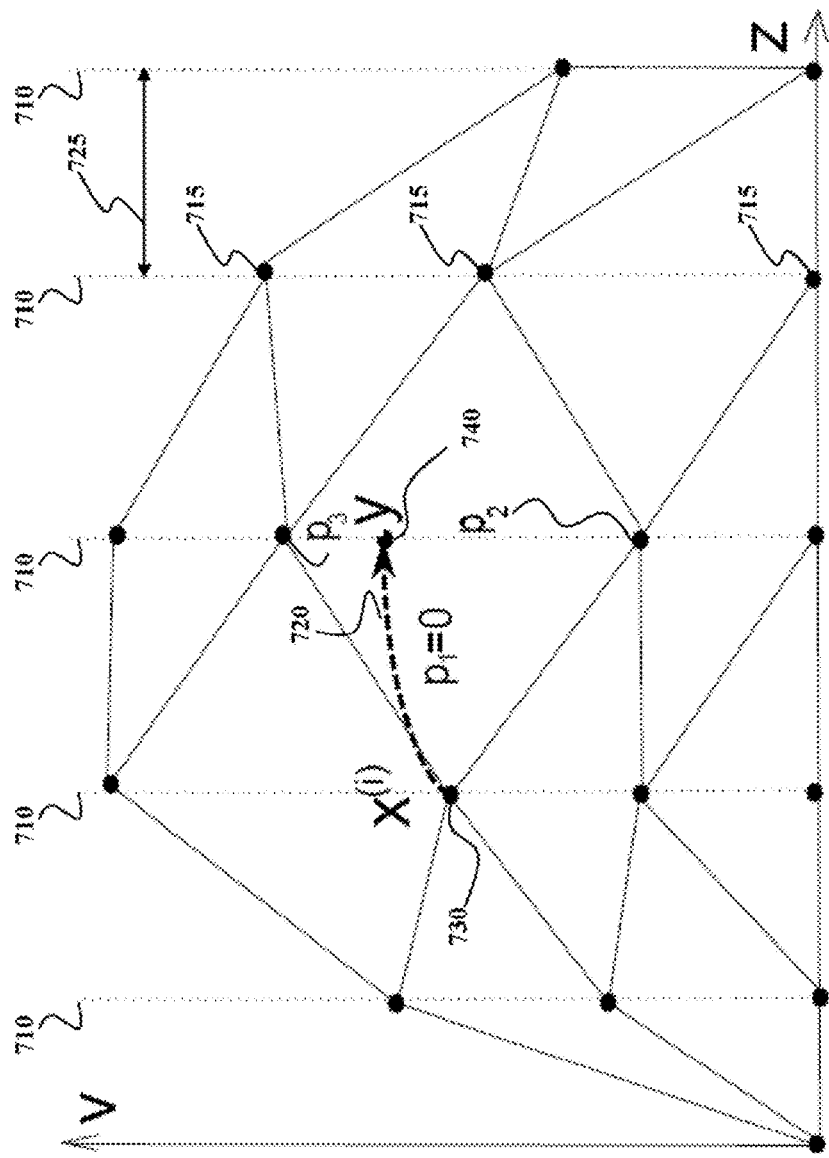
FIG. 7A is a schematic of a MDP without self transitions.
Figure 7B:
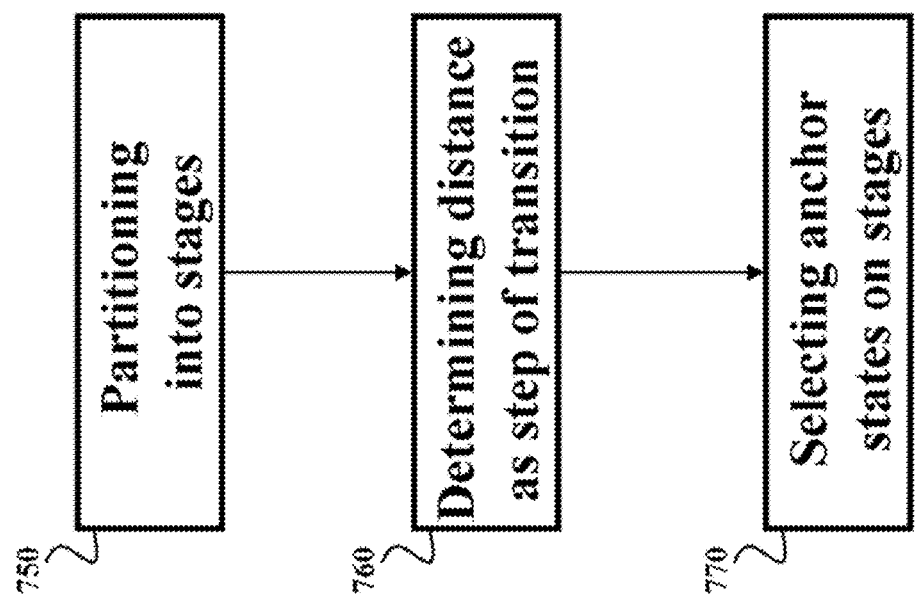
FIG. 7B is are schematics of an equal-distance (ED) MDP method according to embodiments of the invention.

FIG. 7A show the MPD 700 without self-transitions determined based on the equal-distance (ED) MDP method. FIG. 7B shows an example of a method for determining the MDP 700. The route z in the continuous space (z,v) of the moving vehicle is partitioned by multiple vertical lines 710 $z=z_j$, and each of these lines include a number of anchor states 715 of the MDP having the same coordinate Z. The transition rules of the MDP are also changed, i.e., each transition 720 starts at a state 730 with coordinates [$z_j$,v], for some line index j and velocity v, and the control action u is executed until the distance coordinate reaches ending state y 740 on the next line, i.e., $z=z_{j+1}$. Duration of the transition 725 varies according to the starting state and the control action.

Due to ED method, the decomposition of the ending state y into barycentric coordinates results in at most two non-zero values for the three coordinates, i.e., $p_2$ and $p_3$, because the ending state y is always on one of the sides of a triangle in the Delaunay triangulation of the state space. Equivalently, when the barycentric coordinates are interpreted as transition probabilities of the MDP, transitions always start at a state on line $z_j$ and end in one or two states on line $z_{j+1}$, meaning that the MDP does not have self transitions.

Some embodiments partition 750 the continuous space of traveled distance in a set of periods of distances forming a set of stages in the continuous space. The set of anchor states is selected 770 such that a location of each anchor state in the continuous space is on a stage from the set of stages, i.e., the states lying on line $z_j$ forms stage j. The resulting MDP is decomposed in sequential stages, and the vehicle moves from stage to stage in each decision step, i.e., the step of the transition is determined 760 as a function of distance, such that each control transition the system from the previous state of a previous stage to the next state on a next stage. Then, by performing Bellman back-ups stage by stage, starting with the last stage and proceeding backward in time, the value function is determined in only one pass of state space, rather than in multiple passes required by the value iteration procedure.

The resulting MDP is the ED-MDP, because all transitions between states in stages j and j+1 cover the same distance along the vehicle path (equal to $z_{j+1}-z_j$). The ED-MDP is a special case of the general MDP approach, where all barycentric coordinates are degenerate in a way that at most two of them are greater than zero. From computational point of view, determining these positive coordinates is also much simpler than in the general case, because only the states in stage j+1 are be considered. One embodiment sorts the velocities in ascending order and use a binary search on the velocities to find the two states with positive transition probabilities. In addition, one variation of this embodiment spaces the states in a given stage equally along the velocity coordinate with step $\Delta v$, and the computation of transition coordinates is reduced to rounding up and down of the ratio $v/\Delta v$ of the velocity v of the ending state y and the discretization step $\Delta v$.

Equal-Time MDP for FTT

Figure 8A:
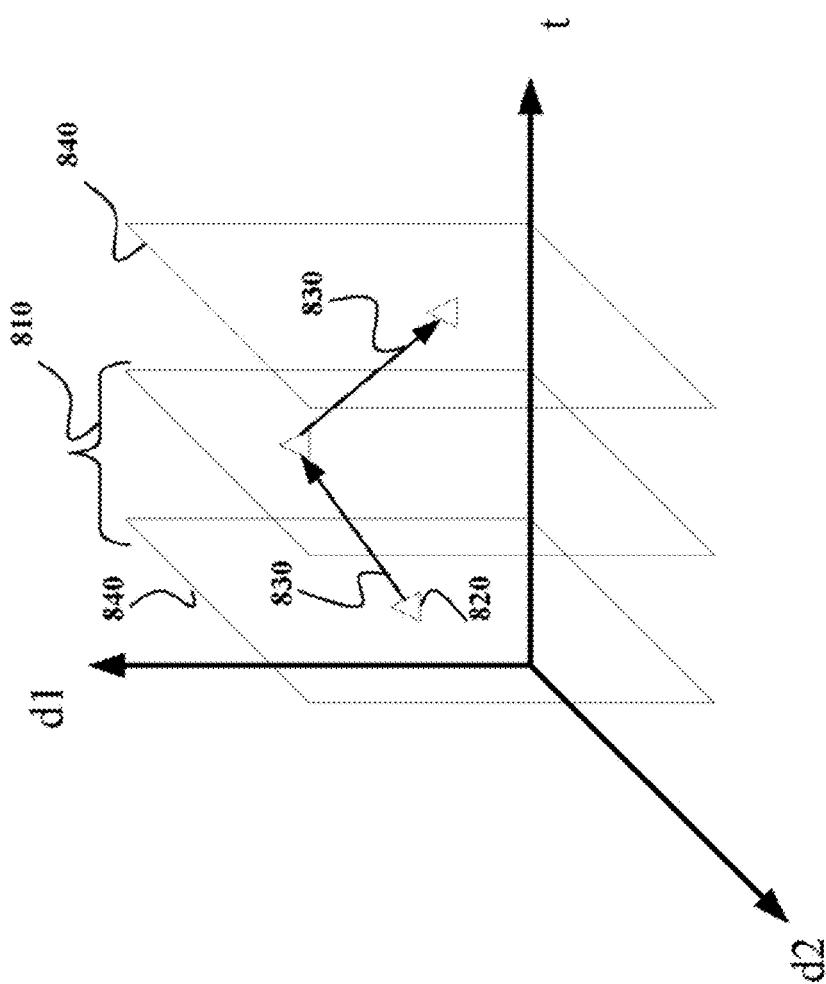
Figure 8C:
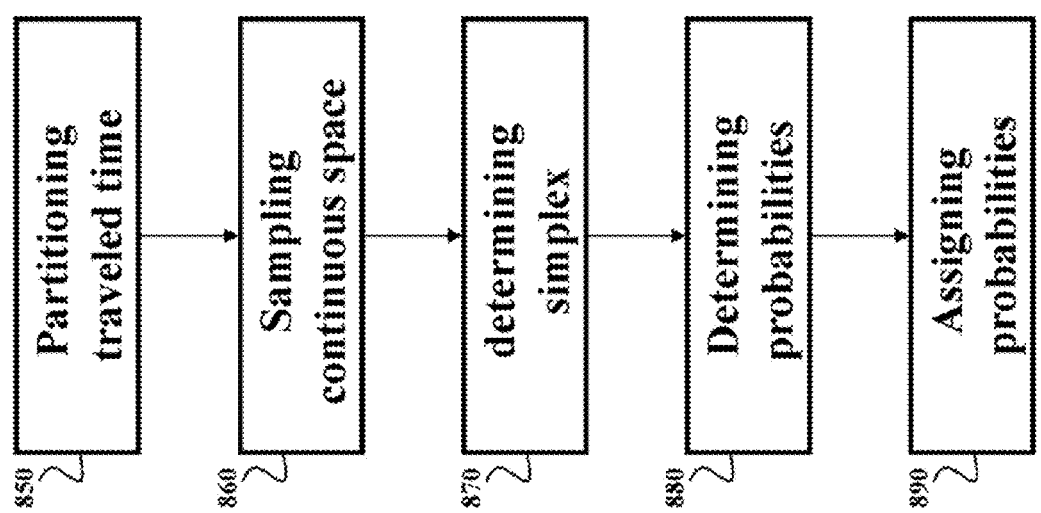

FIGS. 8A-C show some principles and an example of a method for determining the run-curve for a trip of the vehicle having the terminal time T fixed, according to some embodiments of the invention. Those embodiments augment the state space 800 of the MDP with a time coordinate $t_k$, such that $t_k=k\Delta t$, and $T=t_K=K\Delta t$. In this case, the terminal time T is an integer multiple of the time step $\Delta t$ 810. Each state 820 of the MDP is described by the triple [z,v,t], and transitions 830 occur between consecutive time steps. The state space of the MDP can be organized into time slices 840, where each slice is a replica of the triangulation for the ET-MDP case. e.g., the continuous space 200. Each transition takes place between a starting state in one slice and an end state in the next slice.

The MDP policy is determined by computing the value function V(s,t) for every augmented state (s,t), where the state includes time. In general, the value function for the same state s, but different times $t_1$ and $t_2$, is not the same. In this case, the Bellman back-up for the augmented states is $$V(s, t_k) := \min_u \left[ R(s, u) + \sum_{s'} Pr(s_{k+1} = s' \mid s_k = s, u_k = u) V(s', t_{k+1}) \right]. \quad (3)$$

Because the successor states s' is always in slice k+1 (for time $t_{k+1}$), there are no self transitions in the MDP. Such three-dimensional sampling, wherein the MDP for the predetermined time of the trip includes a separate replica of the triangulation for multiple time steps organized into time slices and each transition is performed from one time slice to the next, eliminates the self-transition problem.

The value function can be determined by dynamic programming, using the above equation, starting with the last slice (K), and proceeding backward in time until the starting slice and state. Although the method is not iterative, and only a single pass over the augmented state space is necessary. This MDP has K times more states than the one for the ET-MDP or ED-MDP for VTT, and its computation time is that many times longer.

FIG. 8C shows a block diagram of a method for determining Markov decision process transitioning a system from an initial state to a final state in a continuous space defined by state variables of the system. The state variables include speed of the vehicle, position of the vehicle and a travel time the vehicle travels over the traveled distance forming a three-dimensional continuous space.

At step 850, the method partitions the traveled time in a set of periods of times forming a set of time slices in the continuous space, such that each control transitions the system from the previous state in a previous time slice to the next state in a next time slice. At step 860, the method samples the continuous space to determine the set of anchor states, such that each anchor state is located in a time slice, wherein each time slice includes at least one anchor state, such that each control transitions the MDP from the anchor state in the previous time slice to the next anchor state in the next time slice.

Next, a simplex 240 enclosing the state in the next time slice is determined 870, wherein vertices of the simplex are formed by a subset of the set of anchor states in the next time slice. The probability of transitioning the MDP from the anchor state to each anchor state in the subset is determined 880 as barycentric coordinates of the location of the state within the simplex, and the probability of transitioning the MDP from the anchor state to the next anchor state not forming the subset is assigned 890 zero.

The embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining a run-curve of a motion of a vehicle during a trip along a route as a function of at least a velocity of the vehicle and a position of the vehicle in a continuous space of the trip, comprising steps of:
   determining a Markov decision process (MDP) with respect to a set of anchor states selected from the continuous space, such that a control moving the vehicle to a state transitions the MDP to an anchor state with a probability determined as a function of a distance between the anchor state and the state in the continuous space, wherein the determining the MDP comprises:
      partitioning a traveled distance of the vehicle in a set of periods of distances forming a set of stages in the continuous space;
      determining a step of the transition as a period of distance, such that each control transition the system from a previous state of a previous stage to a next state on a next stage; and
      selecting the set of anchor states such that a location of each anchor state in the continuous space is on a stage from the set of stages;
   solving the MDP subject to constraints to determine an MDP policy optimizing a cost function representing a cost of the motion of the vehicle; and
   determining the run-curve based on the MDP policy, wherein at least some of the steps are performed in a processor of the vehicle.

2. The method of claim 1, wherein the constraints include one or combination of a legal constraint, a constraint of the route and a constraint of the vehicle.

3. The method of claim 1, wherein the cost function represents energy consumption of the vehicle during the trip, such that the run-curve optimizes the energy consumption of the vehicle during the trip.

4. The method of claim 1, wherein the cost function represents both energy consumption of the vehicle during the trip and a total time of the trip, such that the run-curve optimizes a combination of energy consumption of the vehicle and a total time of the trip.

5. The method of claim 1, wherein the cost function represents energy consumption of the vehicle during a predetermined time of a trip, such that the run-curve optimizes the energy consumption of the vehicle during the predetermined time of the trip.

6. The method of claim 1, wherein the determining the run-curve based on the MDP policy uses a method selected from a group consisting of a nearest anchor point method, a largest vote method, and a highest expected merit method.

7. The method of claim 1, wherein the determining the MDP comprises:
   determining a simplex enclosing the state in the continuous space, wherein vertices of the simplex are formed by a subset of the set of anchor states; and
   determining the probability of transitioning the MDP from the anchor state to each anchor state in the subset as barycentric coordinates of a location of the state within the simplex.

8. The method of claim 1, wherein the run-curve is further a function of a traveled time, further comprising:

partitioning the traveled time in a set of periods of times forming a set of time slices in the continuous space, such that each control transitions the system from the previous state in a previous time slice to the next state in a next time slice;

sampling the continuous space to determine the set of anchor states, such that each anchor state is located in a time slice, wherein each time slice includes at least one anchor state, such that each control transitions the MDP from the anchor state in the previous time slice to the next anchor state in the next time slice;

determining a simplex enclosing the state in the next time slice, wherein vertices of the simplex are formed by a subset of the set of anchor states in the next time slice;

determining the probability of transitioning the MDP from the anchor state to each anchor state in the subset as barycentric coordinates of the location of the state within the simplex; and assigning the probability of transitioning the MDP from the anchor state to the next anchor state not forming the subset as equal to zero.

9. A method for determining an optimal sequence of controls transitioning a system from an initial state to a final state in a continuous space defined by state variables of the system, wherein the optimal sequence is monotonically increasing over at least one state variable, wherein the system is a dynamic system having states defined by a dynamic function of previous states and a discrete set of controls, wherein, for each transition, a control is selected from the discrete set of controls, such that, for each control, the dynamic function transitions the system from a previous state to a next state over a step of transition, wherein the system includes a vehicle, such that the optimal sequence of controls determines a run-curve of a motion of the vehicle during a trip, comprising:

determining Markov decision process (MDP) with respect to a set of anchor states selected from the continuous space, such that each control from the discrete set of controls transitions the MDP from an anchor state to a next anchor state with a probability determined based on a location of the next anchor state in the continuous space with respect to a location of a state in the continuous space, in which the dynamic function of the anchor state and a corresponding control transitions the system;

solving the MDP to determine an optimal policy for the MDP defining an optimal control for each anchor state; and determining the optimal sequence of controls in the continuous space based on the optimal policy, wherein the state variables include a speed of the vehicle and a traveled distance of the vehicle, wherein the traveled distance is bound by a beginning of the distance corresponding to the initial state and an end of the distance corresponding to the final state, wherein the speed of the vehicle is bound by legal constraints, and wherein the control is bound by mechanical constraints of the system, and, wherein at least some of the steps of the method are performed by a processor of the vehicle.

10. The method of claim 9, wherein the set of anchor states forms a set of simplexes, such that vertices of each simplex are defined by corresponding anchor states, further comprising:

assigning the probability of transitioning the MDP from the anchor state to the next anchor equals zero, if the next anchor state does not form a simplex enclosing the state in the continuous space; and otherwise determining the probability of transitioning the MDP from the anchor state to the next anchor as a convex decomposition of the location of the state with respect to the location of the next anchor state.

11. The method of claim 9, further comprising:

applying Delaunay triangulation to the set of anchor states to produce a set of simplexes;

determining a simplex enclosing the state in the continuous space; and determining the probability of transitioning the MDP from the anchor state to each anchor state in the subset as barycentric coordinates of the location of the state within the simplex.

12. The method of claim 9, further comprising:

determining the step of the transition as a period of time, such that a set of periods of time forms a travel time for which the means of transportation travels over the traveled distance.

13. The method of claim 9, further comprising:

determining the step of the transition as a period of distance, such that a set of periods of distances forms the traveled distance.

14. The method of claim 9, wherein the determining the optimal sequence of controls further comprises:

selecting an optimal control for each state in the continuous state based on an optimal control of a nearest anchor state defined by the optimal policy.

15. The method of claim 9, wherein the determining the optimal sequence of controls further comprises:

selecting an optimal control for each state in the continuous state based on optimal controls of a subset of anchor states forming a simplex enclosing the state, wherein the an optimal control of each anchor state in the subset is scaled based on corresponding barycentric coordinates of the location of the state within the simplex.

16. The method of claim 9, wherein the determining the optimal sequence of controls further comprises:

determining, for each state in the continuous state, a subset of anchor states forming a simplex enclosing the state;

determining, based on the optimal policy, a value of each control at each anchor state in the subset;

determining a combined value of each control as a sum of corresponding controls scaled based on corresponding barycentric coordinates of the location of the state within the simplex; and selecting, for each state in the continuous state, an optimal control having highest corresponding combined value.

17. A method for determining a run-curve of a motion of a vehicle during a trip along a route as a function of at least a velocity of the vehicle and a position of the vehicle in a continuous space of the trip, comprising steps of:

determining a Markov decision process (MDP) with respect to a set of anchor states selected from the continuous space, such that a control moving the vehicle to a state transitions the MDP to an anchor state with a probability determined as a function of a distance between the anchor state and the state in the continuous space, wherein the run-curve is a function of a traveled time, wherein the determining comprises;

partitioning the traveled time in a set of periods of times forming a set of time slices in the continuous space, such that each control transitions the system from the previous state in a previous time slice to the next state in a next time slice;

sampling the continuous space to determine the set of anchor states, such that each anchor state is located in a time slice, wherein each time slice includes at least one anchor state, such that each control transitions the MDP from the anchor state in the previous time slice to the next anchor state in the next time slice;

determining a simplex enclosing the state in the next time slice, wherein vertices of the simplex are formed by a subset of the set of anchor states in the next time slice;

determining the probability of transitioning the MDP from the anchor state to each anchor state in the subset as barycentric coordinates of the location of the state within the simplex; and assigning the probability of transitioning the MDP from the anchor state to the next anchor state not forming the subset as equal to zero;

solving the MDP subject to constraints to determine an MDP policy optimizing a cost function representing a cost of the motion of the vehicle; and determining the run-curve based on the MDP policy, wherein at least some of the steps are performed in a processor of the vehicle.

* * * * *